(12) United States Patent
Patel et al.

(10) Patent No.: US 10,852,989 B1
(45) Date of Patent: Dec. 1, 2020

(54) METHOD AND SYSTEM FOR OFFLOADING A CONTINUOUS HEALTH-CHECK AND RECONSTRUCTION OF DATA IN A DATA CLUSTER

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/553,322

(22) Filed: Aug. 28, 2019

(51) Int. Cl.
 *G06F 3/00* (2006.01)
 *G06F 3/06* (2006.01)
(52) U.S. Cl.
 CPC .......... *G06F 3/0653* (2013.01); *G06F 3/0614* (2013.01); *G06F 3/0641* (2013.01); *G06F 3/0652* (2013.01); *G06F 3/0659* (2013.01); *G06F 3/0683* (2013.01)

(58) Field of Classification Search
 USPC ....................................................... 711/154
 See application file for complete search history.

(56) References Cited

U.S. PATENT DOCUMENTS

| 6,445,705 B1 * | 9/2002 | Holden | ............... H04L 12/5601 340/2.2 |
| 2010/0262772 A1 * | 10/2010 | Mazina | ................. G06F 3/0613 711/114 |

* cited by examiner

*Primary Examiner* — Jae U Yu
(74) *Attorney, Agent, or Firm* — Chamberlain, Hrdlicka, White, Williams & Aughtry

(57) ABSTRACT

A method for managing data includes obtaining, by a storage controller, data from a host, applying an erasure coding procedure to the data to obtain a plurality of data chunks and at least one parity chunk, deduplicating the plurality of data chunks to obtain a plurality of deduplicated data chunks, generating storage metadata associated with the plurality of data chunks and the at least one parity chunk, storing, across a plurality of persistent storage devices, the plurality of deduplicated data chunks and the at least one parity chunk, wherein the plurality of persistent storage devices is operatively connected to the storage controller and a second storage controller, storing the storage metadata in the storage controller, and sending a copy of the storage metadata to the second storage controller.

20 Claims, 9 Drawing Sheets

US 10,852,989 B1

METHOD AND SYSTEM FOR OFFLOADING A CONTINUOUS HEALTH-CHECK AND RECONSTRUCTION OF DATA IN A DATA CLUSTER

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for managing data. The method includes obtaining, by a storage controller, data from a host, applying an erasure coding procedure to the data to obtain a plurality of data chunks and at least one parity chunk, deduplicating the plurality of data chunks to obtain a plurality of deduplicated data chunks, generating storage metadata associated with the plurality of data chunks and the at least one parity chunk, storing, across a plurality of persistent storage devices, the plurality of deduplicated data chunks and the at least one parity chunk, wherein the plurality of persistent storage devices is operatively connected to the storage controller and a second storage controller, storing the storage metadata in the storage controller, and sending a copy of the storage metadata to the second storage controller.

In general, in one aspect, the invention relates to a non-transitory computer readable medium that includes computer readable program code, which when executed by a computer processor enables the computer processor to perform a method for managing data. The method includes obtaining, by a storage controller, data from a host, applying an erasure coding procedure to the data to obtain a plurality of data chunks and at least one parity chunk, deduplicating the plurality of data chunks to obtain a plurality of deduplicated data chunks, generating storage metadata associated with the plurality of data chunks and the at least one parity chunk, storing, across a plurality of persistent storage devices, the plurality of deduplicated data chunks and the at least one parity chunk, wherein the plurality of persistent storage devices is operatively connected to the storage controller and a second storage controller, storing the storage metadata in the storage controller, and sending a copy of the storage metadata to the second storage controller.

In general, in one aspect, the invention relates to a data cluster that includes a first storage controller, a second storage controller, and a plurality of persistent storage devices, wherein the first storage controller is programmed to obtain data from a host, apply an erasure coding procedure to the data to obtain a plurality of data chunks and at least one parity chunk, deduplicate the plurality of data chunks to obtain a plurality of deduplicated data chunks, generate storage metadata associated with the plurality of data chunks and the at least one parity chunk, store, across the plurality of persistent storage devices, the plurality of deduplicated data chunks and the at least one parity chunk, store the storage metadata in the first storage controller, and send a copy of the storage metadata to the second storage controller.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
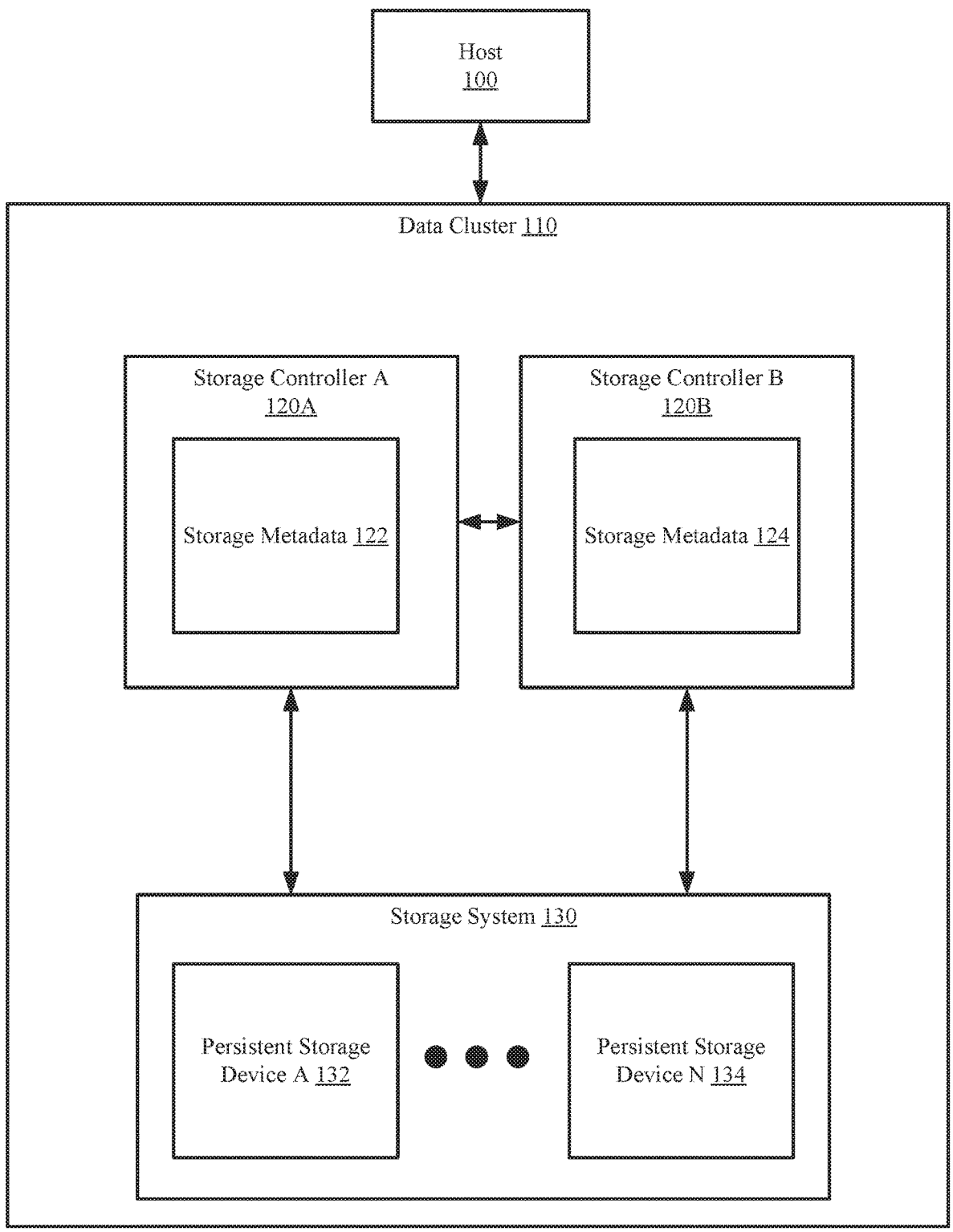
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data in a data cluster. Embodiments of the invention may utilize a storage controller that applies an erasure coding procedure on data obtained from a host to divide the data into data chunks and to generate parity chunks using the data chunks. Optionally, the storage controller may then perform deduplication on the data chunks to generate deduplicated data that includes deduplicated data chunks. The deduplicated data chunks and the parity chunks are subsequently distributed to persistent storage devices in a storage system in accordance with an erasure coding procedure.

In one or more embodiments of the invention, each storage controller in the data cluster stores storage metadata that specifies the persistent storage devices in which each data chunk and parity chunk is stored. The storage metadata may be distributed to the storage controllers in the data cluster to maintain storage metadata consistency.

In one or more embodiments of the invention, each storage controller in the data cluster is equipped to perform a continuous health-check on the data stored in a storage system operatively connected to the storage controller. The health check may include identifying a data or parity chunk stored in a persistent storage device assigned to the storage controller and determining whether the chunk is properly stored and accessible in the persistent storage device. If the storage controller determines that the chunk is not properly stored or accessible, the storage controller may perform a reconstruction of the chunk using other chunks stored in other persistent storage devices in the storage system. Embodiments of the invention may further include updating the storage metadata based on the reconstruction and sending the updated storage metadata to other storage controllers.

FIG. 1 shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
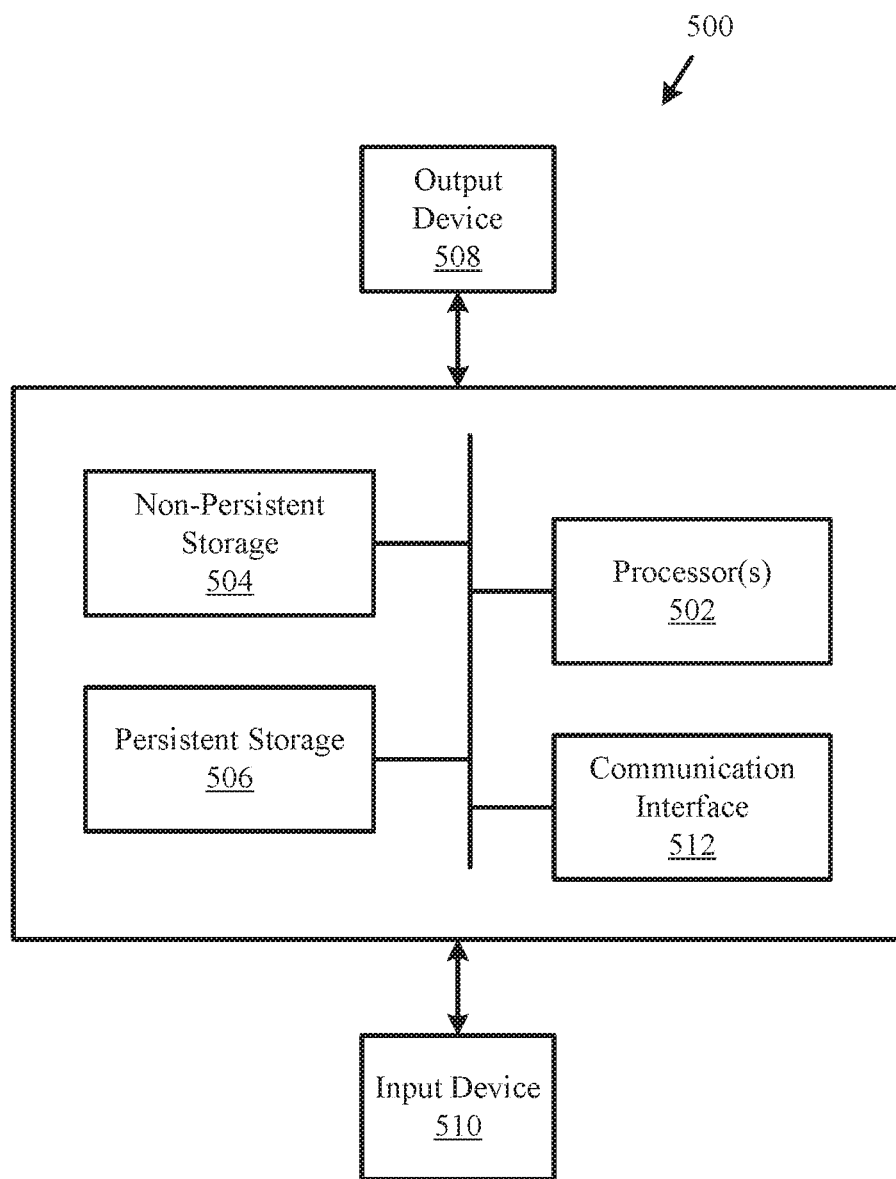
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data generated by the host (100). The data may be deduplicated versions of data obtained from the host. The data cluster may, via an erasure coding procedure, store portions of the deduplicated data across persistent storage devices operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

Continuing with the discussion of FIG. 1, the data cluster (110) may include at least two storage controllers (120A, 120B) and a storage system (130). The storage controllers (102A, 120B) may each store storage metadata (122, 124). Each of the aforementioned components may be operatively connected via any combination of wired and/or wireless connections. Each of the aforementioned components is discussed below.

In one or more embodiments of the invention, a storage controller (120A, 120B) is a device that includes functionality to perform deduplication on data obtained from a host (e.g., 100). A storage controller (e.g., 120A) may utilize information useful to perform the aforementioned functionality. The information may be storage metadata (122). In one or more embodiments of the invention, the storage metadata (122) is a data structure that stores unique identifiers of portions data stored in the data cluster (110). The unique identifiers stored in the storage metadata (122) may be used to determine whether a data chunk of the obtained data is already present elsewhere in the data cluster (110) (specifically, the storage system (130)). The storage controller (120A) may use the storage information to perform the deduplication and generate deduplicated data. After deduplication, an erasure coding procedure may be performed on the data in order to generate parity chunks. The storage controllers (120A, 120B) may perform the deduplication and erasure coding procedure via the method illustrated in FIG. 3A.

In one embodiment of the invention, the storage controller may not implement deduplication. In such scenarios, the data is divided into data chunks (which are not deduplicated) and then parity chunks are generated using the aforementioned data chunks. The data and parity chunks are then distributed to the persistent storage devices in accordance with the erasure coding procedure.

In one or more embodiments of the invention, the storage controllers (120A, 120B) are equipped with specialized hardware that perform all or a portion of the aforementioned functionality. The specialized hardware may be, for example, a compute acceleration device (CAD). The CAD may be programmed to perform a continuous health-check on data chunks and parity chunks stored in the storage system (130) and to perform reconstruction of corrupted or otherwise inaccessible chunks.

In one or more embodiments of the invention, the CAD is a physical device that includes processing hardware (not shown) and memory (not shown). The CAD may include other elements/components without departing from the invention. The processing hardware may include, but is not limited to, a field-programmable gate array, application specific integrated circuit, programmable processor, microcontroller, digital signal processor, a host bus adapter (HBA) card, other processing hardware, or any combination thereof. Depending on the implementation, the CAD may also include persistent storage that may include computer readable instructions, which may be executed by the processing hardware, to perform all or a portion of the functionality of the method shown in FIG. 3B. The memory may be, for example, Random Access Memory (RAM). The memory (or volatile storage) in the CAD may include a copy of the storage metadata (122, 124). The processing hardware may be adapted to provide the functionality of the CAD described throughout this application.

In one or more embodiments of the invention, the storage metadata (122, 124) is a data structure that specifies the data chunks (which may or may not be deduplicated) and the parity chunks stored in the data cluster (110). The storage metadata (122, 124) may further store storage location information of the data chunks and parity chunks.

In one or more embodiments of the invention, the storage metadata (122, 124) is stored in the storage controllers (120A, 120B). A copy of the storage metadata (124) may be distributed to a second storage controller (120B) (or multiple other storage controllers (not shown)) after data associated with the storage metadata (122) is generated and stored in the storage system (130). In this manner, if the storage metadata (122) stored in the first storage controller (120A) experiences a failure (e.g., it becomes unavailable, corrupted, etc.), the storage metadata (124) may be recovered from the second storage controller (120B). For additional details regarding the storage metadata (122, 124), see, e.g., FIG. 2.

In one embodiment of the invention, the storage controller is configured to perform a health check on at least a portion of the persistent storage devices. Said another way, each storage controller is configured to perform a health check a subset of the persistent storage devices to which it is operatively connected. In this manner, the processing load related to the health-checking is distributed across the storage controllers. However, as described in FIG. 3B, if one of the storage controllers fails (or is otherwise unable to perform the health-check on its assigned set of persistent storage devices), then another storage controller (which was not originally assigned the aforementioned set of persistent storage devices) will proceed to also perform health-checking on this additional set of persistent storage devices.

In one or more embodiments of the invention, the storage controllers (120A, 120B) are each implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the storage controller (120A, 120B) described throughout this application and/or all, or a portion thereof, of the methods illustrated in FIGS. 3A-3B.

In one or more embodiments of the invention, the storage controllers (120A, 120B) are each implemented as a logical device. The logical device may utilize the computing resources of any number of computing devices and thereby provide the functionality of the storage controllers (120A, 120B) described throughout this application and/or all, or a portion thereof, of the methods illustrated in FIGS. 3A-3B.

In one or more embodiments of the invention, the storage system (130) includes persistent storage devices (132, 134). In one or more embodiments of the invention, the persistent storage devices (132, 134) store data. The data may be data chunks and/or parity chunks. The generation of the data chunks and parity chunks is described below with respect to FIG. 3A.

In one or more embodiments of the invention, a data chunk is a data structure that includes a portion of data that was obtained from a host (100). The data chunks may be deduplicated by a storage controller (120A, 120B). Each of the data chunks may be used by the storage controller (120A, 120B)) to reconstruct another data chunk or a parity chunk based on an erasure coding algorithm that was applied to the other data chunk or parity chunk.

In one or more embodiments of the invention, a parity chunk is a data structure that includes a parity value generated using an erasure coding algorithm. The parity value may be generated by applying the erasure coding algorithm to one or more data chunks stored in the storage system (130). Each of the parity chunks may be used by a storage controller (120A, 120B), along with other data chunks and/or parity chunks, to reconstruct another parity chunk or a data chunk based on an erasure coding algorithm that was applied to the other parity chunk or data chunk.

The persistent storage devices (132, 134) may be (or include) non-volatile storage. In other words, the data stored in the persistent storage devices (132, 134) does not get lost or removed when the persistent storage devices (132, 134) lose power. Each of the persistent storage devices (132, 134) may be (or include), for example, solid state drives, hard disk drives, and/or tape drives. The persistent storage devices may include other types of non-volatile or non-transitory storage mediums without departing from the invention.

Figure 2:
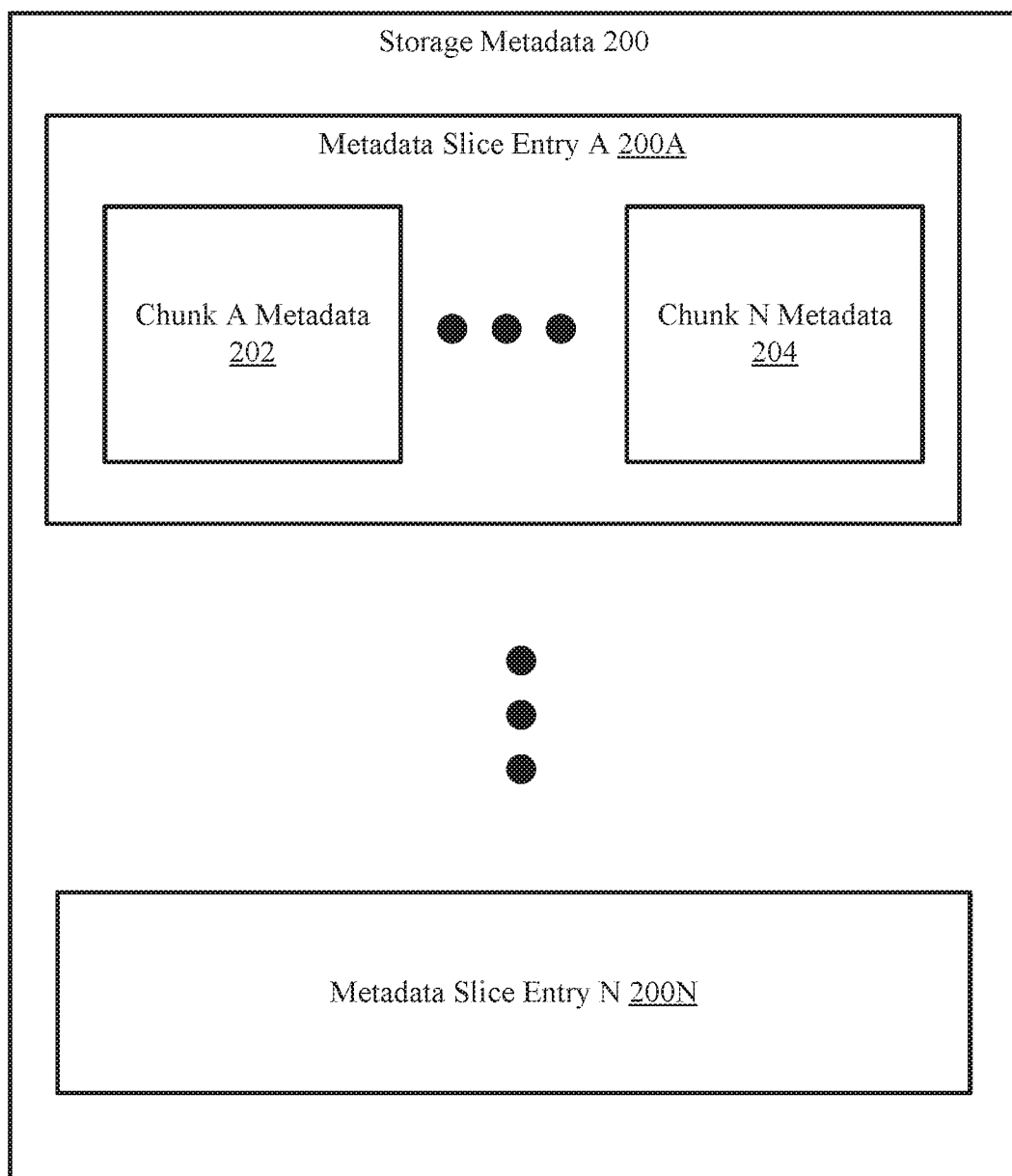
FIG. 2 shows a diagram of storage metadata in accordance with one or more embodiments of the invention.

FIG. 2 shows a diagram of storage metadata in accordance with one or more embodiments of the invention. The storage metadata (200) may be an embodiment of the storage metadata (122, 124, FIG. 1) discussed above. As discussed above, the storage metadata (200) stores information about data chunks or parity chunks. The storage information may include one or more metadata slice entries (200A, 200N). Each metadata slice entry (200A, 200N) may include chunk metadata (202, 204). Each of the aforementioned portions of the storage metadata (200) is discussed below.

In one or more embodiments of the invention, a metadata slice entry (200A, 200N) is an entry that specifies metadata associated with chunks of a data slice.

The metadata slice entry (200A, 200N) includes chunk metadata (202, 204). Each chunk metadata (202, 204) may be associated with a data chunk or a parity chunk. Each chunk metadata (202, 204) may include information about a chunk such as, for example, a unique identifier (e.g., a fingerprint also referred to as a Chunk Identifier (CID)) and a storage location of the chunk. The unique identifier of a chunk may be generated using the chunk (e.g., calculated using the data of the chunk). The data chunk referenced in the chunk metadata may be either a deduplicated data chunk or non-deduplicated data chunk.

Figure 3A:
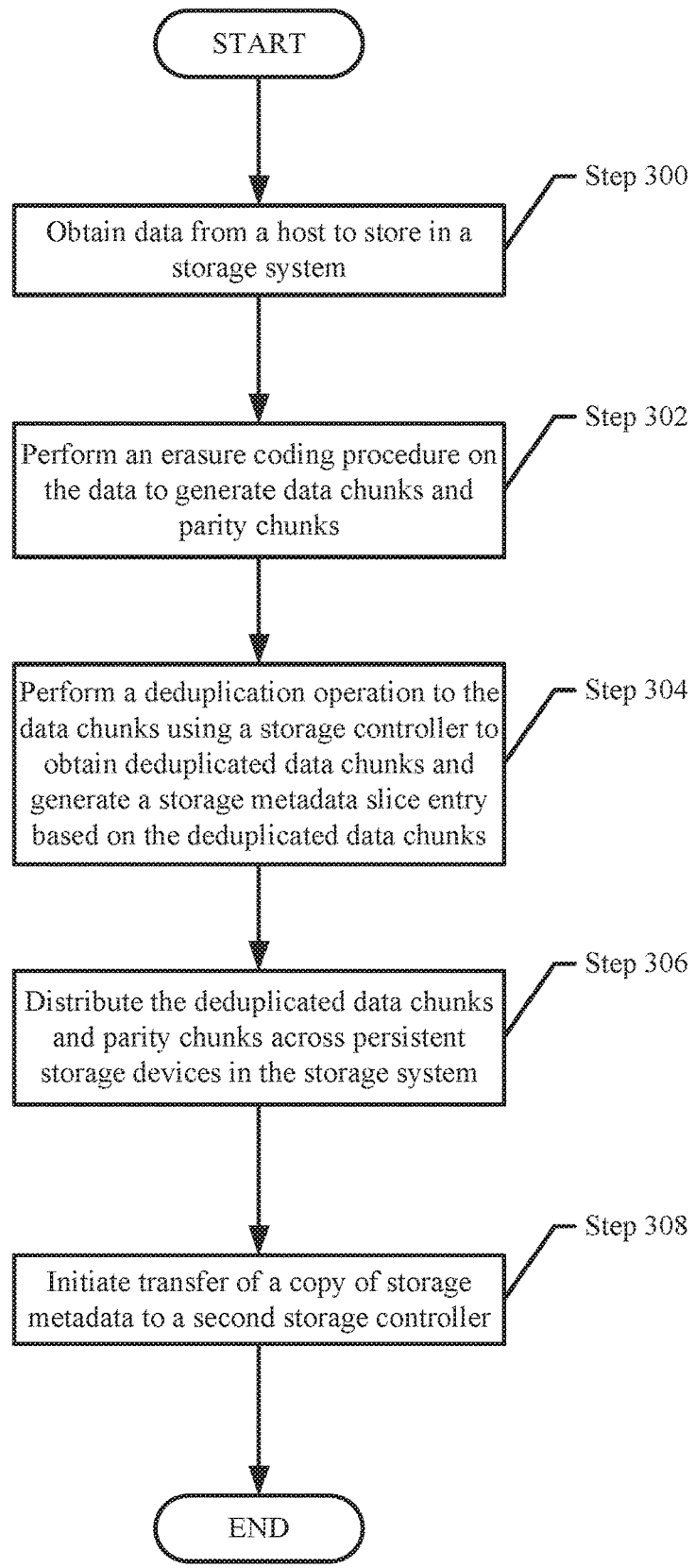
FIG. 3A shows a flowchart for storing data in a data cluster in accordance with one or more embodiments of the invention.

FIG. 3A shows a flowchart for storing data in a data cluster in accordance with one or more embodiments of the invention. The method shown in FIG. 3A may be performed by, for example, a storage controller (120A, 120B, FIG. 1). Other components of the system illustrated in FIG. 1 may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, data is obtained from a host to be stored in a storage system. The data may be a file, a file segment, a collection of files, or any other type of data without departing from the invention.

In step 302, an erasure coding procedure is performed on the data to generate data chunks and parity chunks. In one or more embodiments of the invention, the erasure coding procedure includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention. Continuing with the above discussion, if the erasing code procedure is implementing RAID 3, then a single parity value is calculated. The resulting parity value is then stored in a parity chunk. If erasure coding procedure algorithm requires multiple parity values to be calculated, then the multiple parity values are calculated with each parity value being stored in a separate data chunk.

As discussed above, the data chunks are used to generate parity chunks in accordance with the erasure coding procedure. More specifically, the parity chunks may be generated by applying a predetermined function (e.g., P Parity function, Q Parity Function, etc.), operation, or calculation to at least one of the data chunks. Depending on the erasure coding procedure used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g_0 \cdot D_0 + g_1 \cdot D_1 + g_2 D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding procedure, which may be specified by the host, by the data cluster, and/or by another entity.

In step 304, a deduplication operation is performed on the data chunks to obtain deduplicated data chunks. Additionally, a storage metadata slice entry is generated based on the data chunks and the parity chunks. In one or more embodiments of the invention, the deduplication is performed by identifying the data chunks of the obtained data and assigning a fingerprint to each data chunk. A fingerprint is a unique identifier that may be stored in metadata of the data chunk. The storage controller performing the deduplication may generate a fingerprint for a data chunk and identify whether the fingerprint matches an existing fingerprint stored in the storage metadata. If the fingerprint matches an existing fingerprint, the data chunk may be deleted, as it is already stored in the data cluster. If the fingerprint does not match any existing fingerprints, the data chunk may be stored as a deduplicated data chunk. Additionally, the fingerprint of each deduplicated data chunk is stored in a storage metadata slice entry of the storage metadata. A fingerprint (or other unique identifier) of each parity chunk is also generated and stored in the storage metadata slice entry.

In one or more embodiments of the invention, the deduplicated data chunks collectively make up the deduplicated data. In one or more embodiments of the invention, the deduplicated data chunks are the data chunks that were not deleted during deduplication.

In step 306, the deduplicated data chunks and parity chunks are stored across persistent storage devices in the storage system. As discussed above, the deduplicated data chunks and the parity chunks are stored in a manner that minimizes reads and writes from the storage system. In one embodiment of the invention, this minimization is achieved by storing data chunks and parity chunks, which are collective referred to as a data slice (or slice), in the same manner as a prior version of the data slice. The storage controller may use, as appropriate, storage metadata for the previously stored data chunks and parity chunks to determine where to store the data chunks and parity chunks in step 306.

More specifically, in one embodiment of the invention, if the deduplicated data chunks and parity chunks are the first version of a data slice (as opposed to a modification to an existing/previously stored data slice), then the deduplicated data chunks and parity chunks may be stored across the persistent storage devices in the storage system. The location in which the data chunk or parity chunk is stored is specified in the storage metadata slice entry. The scenario does not require the storage controller to use location information for previously stored data chunks and parity chunks.

However, if the deduplicated data chunks and parity chunks are the second version of a slice (e.g., a modification to a previously stored slice), then the deduplicated data chunks and parity chunks are stored across the persistent storage devices using prior stored location information. The location in which the data chunk or parity chunk is stored is specified in the storage metadata slice entry.

For example, consider a scenario in which the first version of the slice includes three data chunks (D1, D2, D3) and one parity chunk (P1) and that they were stored as follows: storage device 1 stores D1, storage device 2 stores D2, storage device 3 stores D3, and storage device 4 stores P1. Further, in this example, a second version of the slice is received that includes three data chunks (D1, D2', D3) and one newly calculated parity chunk (P1'). After deduplication only D2' and P1' need to be stored. Based on the prior storage locations (also referred to as locations) of the data chunks (D1, D2, and D3) and parity chunks (P1) for the first version of the slice, D2' is stored on storage device 2 and P r is stored on storage device 4. By storing the D2' on storage device 2 and P1' on storage device 4 the data chunks and parity chunks associated with the second slice satisfy the condition that all data chunks and parity chunks for the second version of the slice are being stored in separate persistent storage devices. If the location information was not taken into account, then the entire slice (i.e., D1, D2', D3, and P1') would need to be stored in order to guarantee that the requirement that all data chunks and parity chunks for the second version of the slice are being stored in separate persistent storage devices is satisfied.

In one or more embodiments of the invention, if the persistent storage device that obtains the deduplicated data chunk, which is a modified version of a prior stored deduplicated data chunk, then the storage controller may specify for the persistent storage device to: (i) store the modified version of the deduplicated data chunk (i.e., the persistent storage device would include two versions of the data chunk) or (ii) store the modified version of the deduplicated data chunk and delete the prior version of the deduplicated data chunk.

In one embodiment of the invention, the storage controller includes functionality to determine whether a given data chunk is a modified version of a previously stored data chunk. Said another way, after the data is received from a host divided into data chunks and grouped into slices, the storage controller includes functionality to determine whether a slice is a modified version of a prior stored slice. The storage controller may use the fingerprints of the data chunks within the slice to determine whether the slice is a modified version of a prior stored slice. Other methods for determining whether a data chunk is a modified version of a prior stored data chunk and/or whether a slice is a modified version of a prior slice without departing from the invention.

In step 308, transfer of a copy(ies) of storage metadata to a second storage controller is initiated. In one or more embodiments of the invention, the storage metadata is distributed by generating a copy of the storage metadata that includes the storage metadata slice entry generated in step 304 and sending the copy of storage metadata to a second storage controller (or multiple other storage controllers). In this manner, a copy of the storage metadata is stored in multiple storage controllers in the event of a storage metadata failure in one storage controller.

While FIG. 3A describes erasure coding and deduplicating the data, embodiments of the invention may be implemented where the data is only erasure coded and not deduplicated. In such embodiments, step 304 includes generating a storage metadata slice using non-deduplicated data chunks and parity chunks and step 306 includes distributing non-deduplicated data chunks and parity chunks.

Figure 3B:
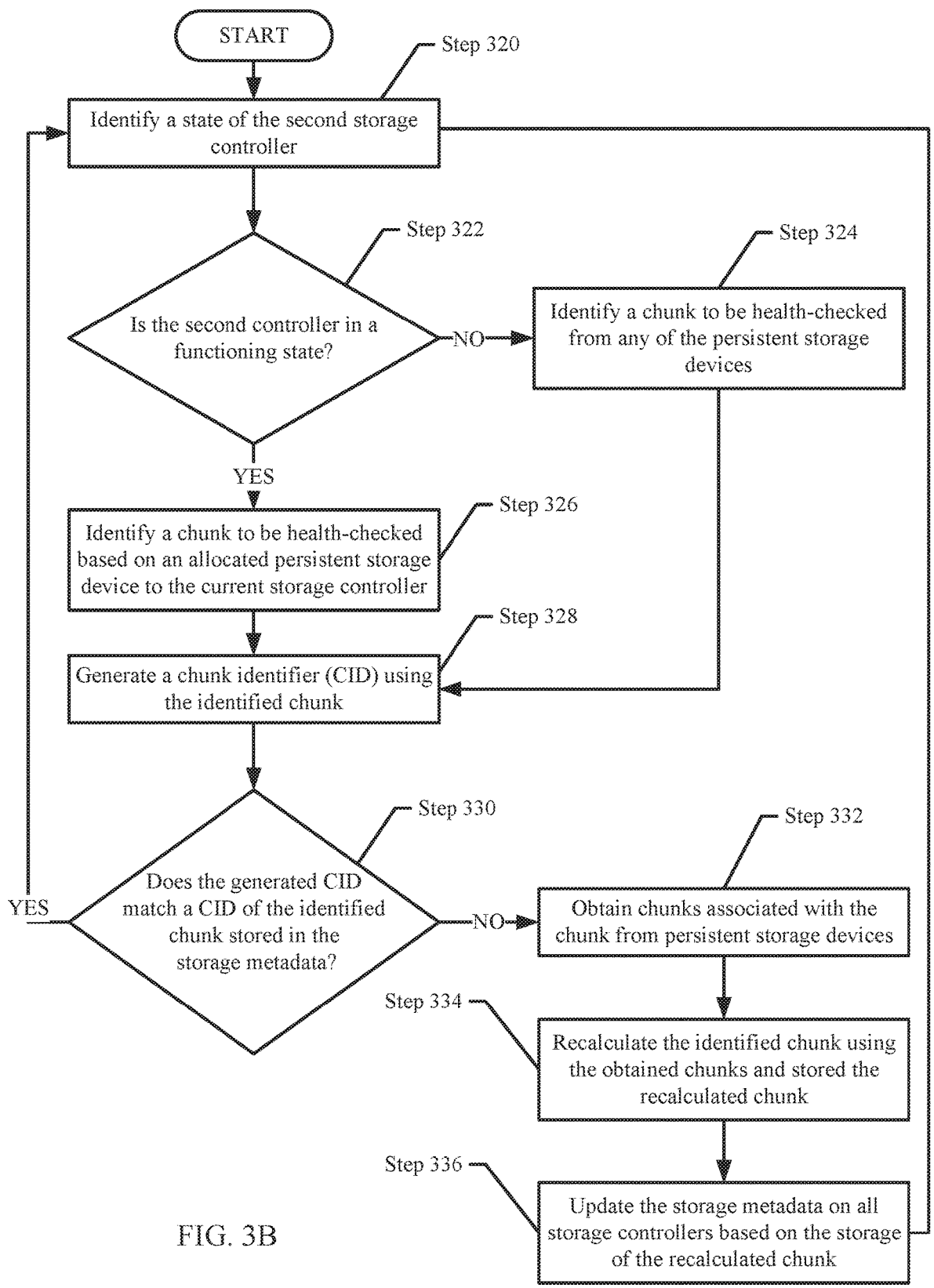
FIG. 3B shows a flowchart for managing a storage metadata failure in accordance with one or more embodiments of the invention.

FIG. 3B shows a flowchart for managing data in accordance with one or more embodiments of the invention. The method shown in FIG. 3B may be performed by, for example, each of the storage controllers (120A, 120B, FIG. 1). Other components of the system illustrated in FIG. 1 may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Continuing with the discussion of FIG. 3B, in step 320, a state of the second controller is identified. In one or more embodiments of the invention, the state of the second controller is identified by periodically sending messages to the second storage controller to verify whether the second controller is accessible, functioning, or in any other state that allows the second controller to perform a continuous health-check on persistent storage devices assigned to the second storage controller. The second controller may send a response that verifies the state of the second controller.

In another embodiment of the invention, the second controller may be configured to periodically send messages to the storage controller. If the store controller may then determine the state of the second storage controller based on whether or not message has been received within the expected timeframe. For example, if the second storage controller is configured to send messages to the storage controller every five minutes, then the storage controller expects to receive a message every five minutes from the second storage controller.

In step 322, a determination is made about whether the second controller is in a functioning state. If the second controller is in a functioning state, the method proceeds to step 326; otherwise, the method proceeds to step 324. The second controller may not be in a functioning state if either: (i) a response to a message sent from the storage controller is not received from the second storage controller or (ii) if an expected message is not received from the second storage controller in the expected timeframe. Other mechanisms may be used to determine the functioning state of the second storage controller without departing from the invention.

In step 324, a chunk to be health-checked is identified from all persistent storage devices (including the persistent storage devices that have been allocated to the second storage controller). In one or more embodiments of the invention, the storage controller may select a chunk (e.g., a data chunk or a parity chunk) stored in a persistent storage device based on a policy implemented by the storage device to health-check the chunk. The storage device may use the storage metadata to identify a storage location of the chunk and/or obtain the chunk from the persistent storage device. The process then proceeds to step 328.

In step 326, a chunk to be health-checked is identified based on an allocated persistent storage device of the storage controller. In one or more embodiments of the invention, the storage controller may select a chunk (e.g., a data chunk or a parity chunk) stored in a persistent storage device allocated to the first storage controller based on a policy implemented by the storage controller to health-check the chunk. The storage controller may use the storage metadata to identify a storage location of the chunk and/or obtain the chunk from the persistent storage device.

Continuing from either step 324 or 326, in step 328, a chunk identifier (CID) is generated using the identifier chunk. The CID is generated by obtaining the chunk from the persistent storage device (i.e., the persistent storage device either allocated to the first storage controller or to the second storage controller), performing a function on the chunk to obtain a unique identifier (e.g., a fingerprint) that is generated based on the content of the data in the chunk. The result is a generated CID.

In one or more embodiments of the invention, the function performed on the data is a hash function. The storage controller may perform a hash function on the chunk to obtain a hash value. The hash value may be used as the generated CID.

In step 330, the storage controller compares the generated CID to a CID associated with the chunk stored in the storage metadata. After comparing the generated CID to a CID of the storage metadata, a determination is made about whether the generated CID matches the CID of the storage metadata. If the generated CID matches the CID of the storage metadata, the method ends following step 324; otherwise, the method proceeds to step 326.

In one or more embodiments of the invention, the determination that the generated CID does not match the CID of the storage metadata implies an unavailability of the chunk. The chunk may be, for example, corrupted or otherwise inaccessible. Additionally, the mismatch may further imply that the persistent storage device (or a portion thereof) that stores the inaccessible chunk is also corrupted and caused the chunk to become inaccessible.

In step 332, chunks associated with the identified chunk are obtained from other persistent storage devices in the storage system. In one or more embodiments of the invention, the storage controller uses the storage metadata to identify a number of chunks to be obtained. The storage metadata may specify a storage metadata slice associated with the chunk. The storage metadata slice is associated with a data slice of the identified chunk. The storage metadata slice may specify chunk metadata for other chunks of the data slice. The chunk metadata for the other chunks may include a storage location for each of the other chunks. Specifically, the storage location of a chunk may specify, for example, a persistent storage device of the storage system in which the chunk is stored. The storage controller may use the chunk metadata of the other chunks to obtain the other chunks from their respective persistent storage devices.

In step 334, the identified chunk is regenerated using the obtained chunks and stored in the storage system. The specific location of the regenerated chunk may vary based on the implementation. In one or more embodiments of the invention, the identified chunk is regenerated using the erasure coding algorithm applied to the data chunks and parity chunks of the data slice. The erasure coding algorithm may be applied to the other chunks (a portion of which may be data chunks while the other portion may be parity chunks that were generated using the erasure coding procedure) to generate a chunk.

In step 336, the storage metadata is updated based on the storage of the regenerated chunk, and an update is set to all storage controllers. In one or more embodiments of the invention, the storage metadata is updated by updating the chunk metadata of the metadata slice entry associated with the regenerated chunk with the new storage location of the regenerated chunk. Additionally, if the CID of the regenerated chunk has changed, the chunk metadata is further updated with the new CID. This update may be propagated to the other storage controllers in the data cluster.

Example

Figure 4A:
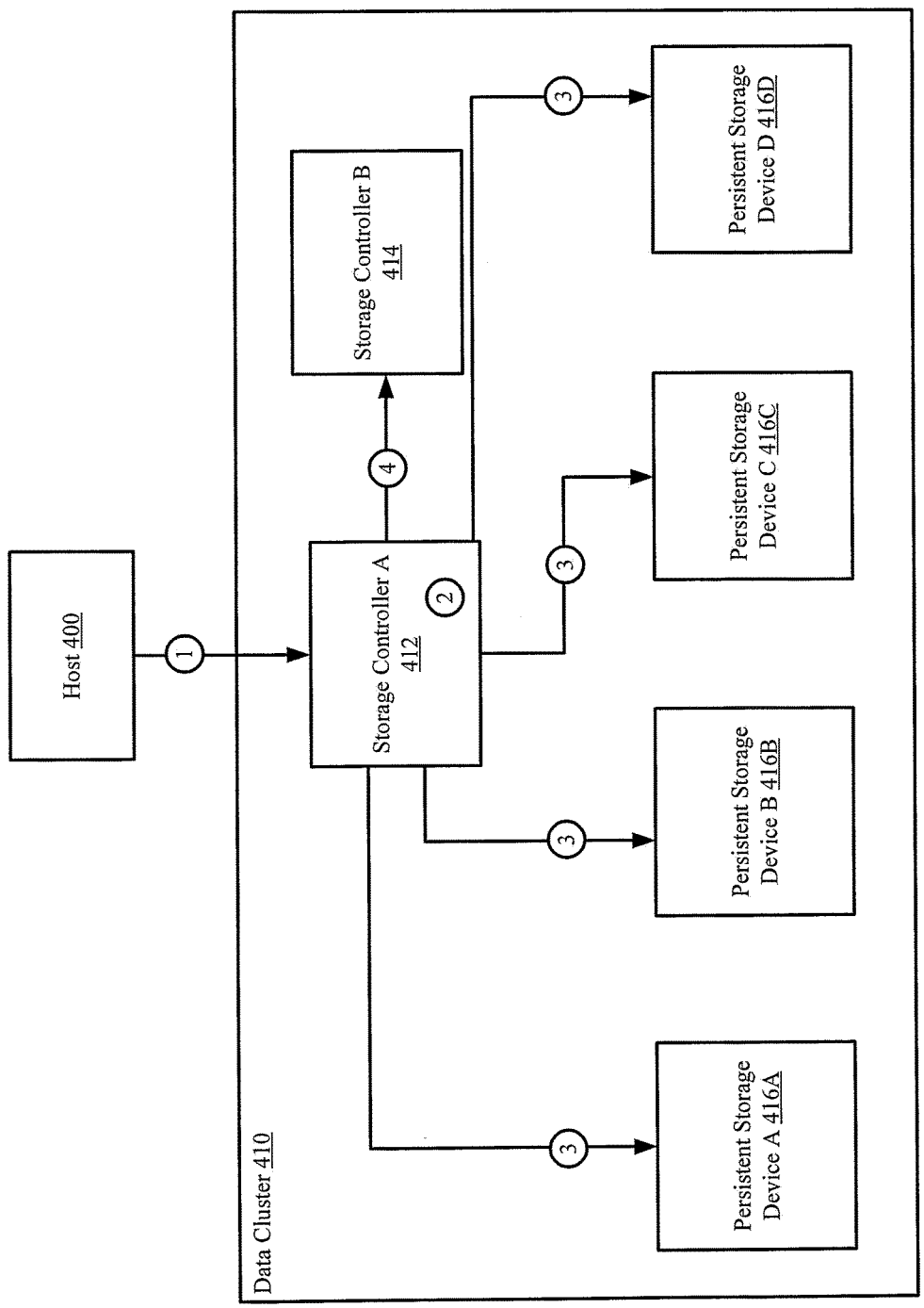
FIGS. 4A-4D show an example in accordance with one or more embodiments of the invention.

The following section describes an example. The example is not intended to limit the invention. The example is illustrated in FIGS. 4A-4D. Turning to the example, consider a scenario in which a data cluster obtains data, which is a file in this example, from a host. The host requests the file be stored in the data cluster in a 3:1 erasure coding procedure. FIG. 4A shows a diagram a system in accordance with one or more embodiments of the invention. The host (400) sends the request to a first storage controller (412) of the data cluster (410) [1].

The storage controller (412) performs the method of FIG. 3A to store the obtained file. Specifically, the storage controller performs an erasure coding on the file [2]. In this example, assume that the erasure coding procedure includes implementing RAID 3. The result of the erasure coding procedure is a group of three data chunks and a parity chunk. The data chunks and parity chunk further undergo a deduplication operation to obtain deduplicated data chunks. Because this file is not part of a previously-stored file, all three data chunks are deduplicated data chunks.

The deduplicated data chunks and the parity chunk are each stored in a unique persistent storage device (416A, 416B, 416c, 416D) [3]. Specifically, a first deduplicated data chunk is stored in persistent storage device A (416A), a second deduplicated data chunk is stored in persistent storage device B (416B), a third deduplicated data chunk is stored in persistent storage device C (416C), and the parity chunk is stored in persistent storage device D (416D).

In addition to storing the deduplicated data chunks and the parity chunks, the storage controller (412) generates a storage metadata slice entry in storage metadata. A unique identifier of each deduplicated data chunk and parity chunk is stored in storage metadata slice entry. The storage controller (412) updates a second storage controller (414) by sending a copy of the storage metadata to the second storage controller (414) [4].

Figure 4B:
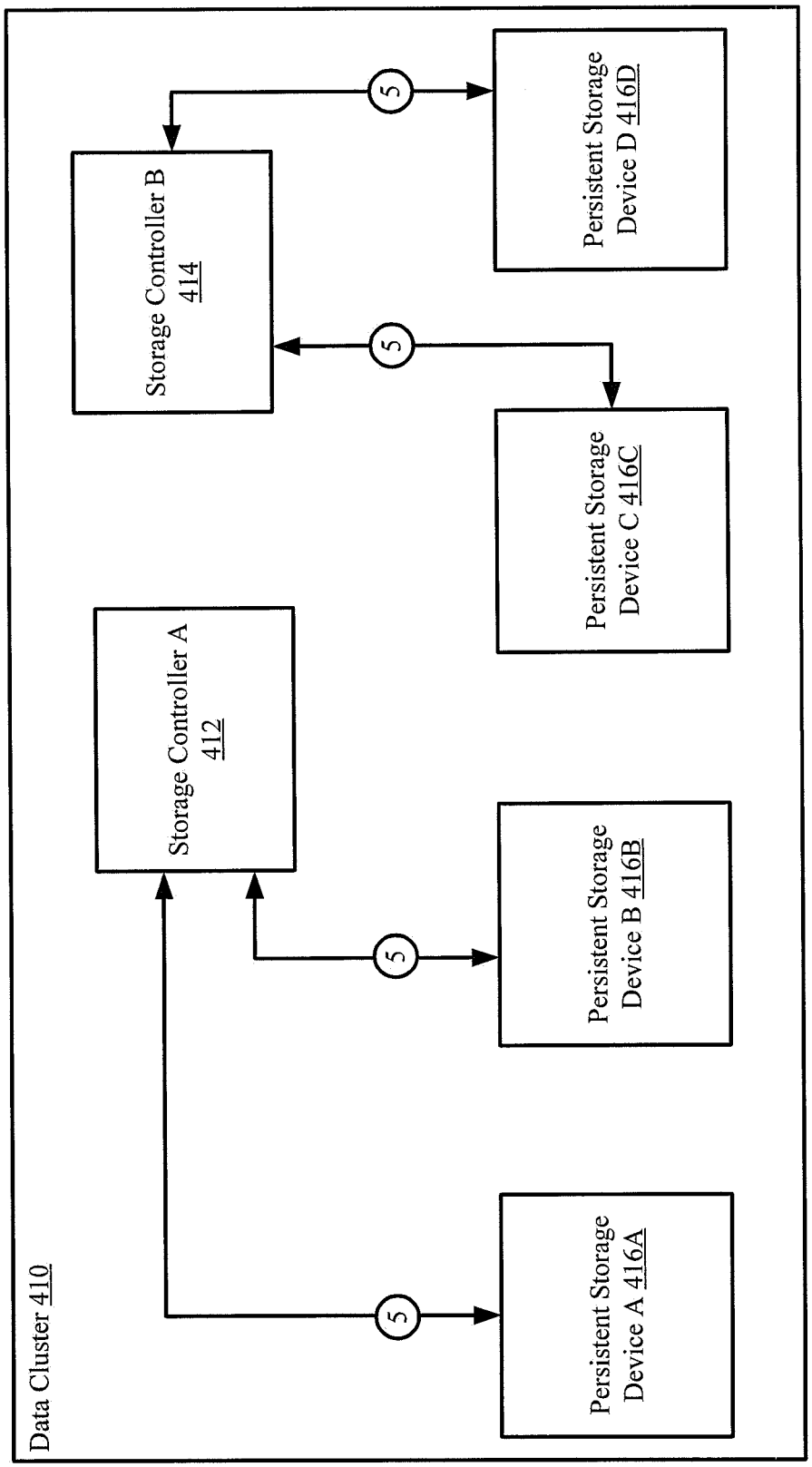

FIG. 4B shows a second diagram of the example system at a second point in time. Each storage controller (412, 414) is performing continuous health-checks to each of an assigned persistent storage device (416A, 416B, 416C, 416D). Specifically, storage controller A (412) performs the continuous health-check on persistent storage devices A (416A) and B (416B); storage controller B (414) performs a continuous health-check on persistent storage devices C (416C) and D (416D) [5].

In this example, a health-check for a chunk includes obtaining the chunk from the respective persistent storage device and generating a chunk identifier (CID) by performing a hash function on the obtained chunk. The generated CID is then compared to a CID stored in the storage metadata to determine whether the generated CID matches a CID of the storage metadata.

Figure 4C:
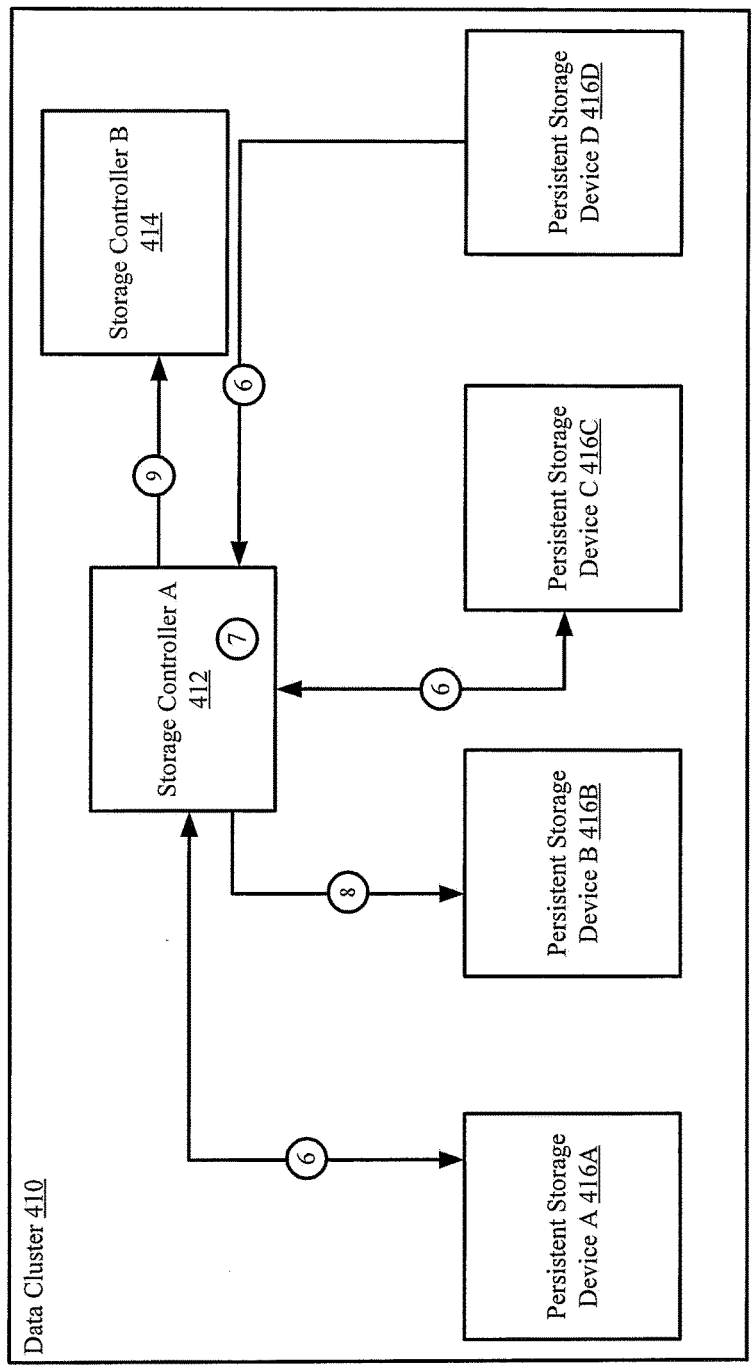

During the continuous health-checks, storage controller A (412) identifies a mismatch in CIDs for a data chunk stored in persistent storage device B (416B). FIG. 4C shows a diagram of the example system at a third point in time. Based on the determination, the storage controller (412) sends a request to the other persistent storage devices (416A, 416C, 416D) to obtain chunks of a data slice associated with the corrupted data chunk [6]. The storage controller (412) uses the storage metadata to identifier the other chunks and then determine where the other chunks are stored.

After the other chunks are obtained, the storage controller (412) performs a reconstruction of the data chunk [7]. The reconstructed data chunk is then stored in persistent storage device B (416B) [8]. Further, the storage metadata is updated with the new storage location of the reconstructed data chunk. The update to the storage metadata is then distributed to the second storage controller (414) so that the storage metadata of the second storage controller (414) may specify the new storage location of the reconstructed data chunk [9].

Figure 4D:
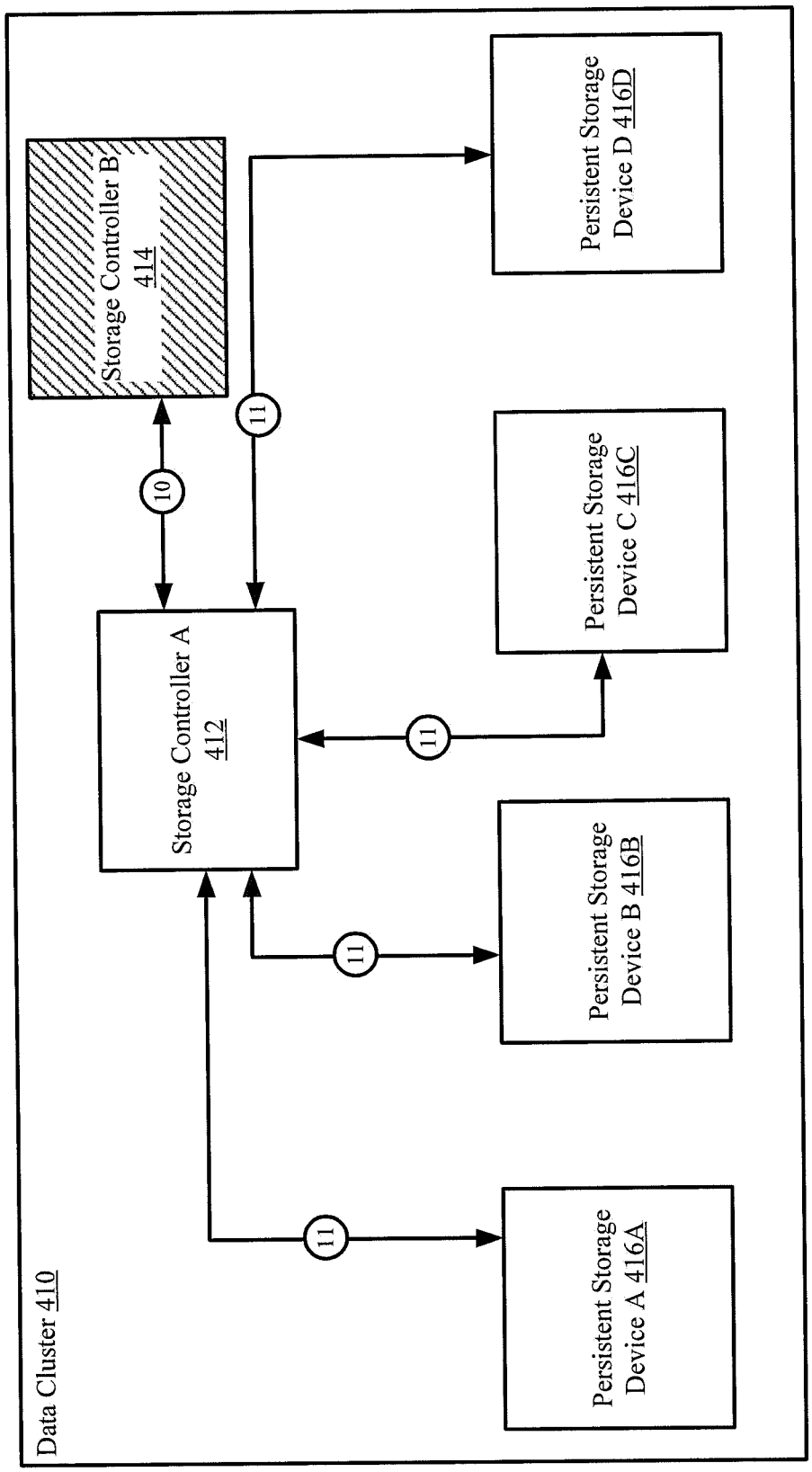

FIG. 4D shows a diagram of the example system at a fourth point in time. The system in FIG. 4D may show storage controller B (414) in an inaccessible state. This inaccessible state may prevent storage controller B (414) from performing the continuous health-checks on the persistent storage devices (416C, 416D) assigned to storage controller B (414).

Storage controller A (412A) attempts to communicate with the storage controller B (414) and determines that storage controller B (414) is not in a functioning state [10]. Storage controller A (412) in response to the determination, performs a continuous health check on the persistent storage devices (416A, 416B) assigned to storage controller A (412) and on the persistent storage devices (416C, 416D) assigned to storage controller B (414) [11]. In this manner, all persistent storage devices (416A, 416B, 416C, 416D) in the data cluster (410) are continuously health-checked even when a storage controller (414) is not in a functioning state.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of storing data in a data cluster. The reliability is improved by connecting a storage system that stores data to a storage controller that includes functionality for performing continuous health-checks on portions of data stored in the storage system. The health-checks may include utilizing storage metadata to determine if the portions of data have been corrupted, unintentionally altered, or otherwise inaccessible. If the storage controller determines that a portion of data is corrupted or otherwise inaccessible, the storage controller may perform methods for reconstructing the corrupted or inaccessible portion of data. The storage metadata may subsequently be updated with the new storage location of the reconstructed portion of data, and the update may be sent to other storage controllers in the data cluster. In this manner, the data cluster is up-to-date with the storage locations of data even after the data has been reconstructed and/or stored in a new storage location.

Further, embodiments of the invention include dividing the persistent storage devices in a storage system between more than one storage controllers to minimize the burden of health-checking data for each storage controller. In this manner, each storage controller is assigned a portion of the persistent storage devices in the storage controllers such that all of the persistent storage devices are health-checked by a storage controller.

In addition, each storage controller is equipped to health-check data of persistent storage devices allocated to another storage controller if the first storage controller determines that the second storage controller is not in a functioning state. In this manner, all persistent storage devices are health-checked even if a storage controller performing health-checks is unable to perform the health-checks to its allocated persistent storage devices.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a storage controller, data from a host;
applying an erasure coding procedure to the data to obtain a plurality of data chunks and at least one parity chunk;
deduplicating the plurality of data chunks to obtain a plurality of deduplicated data chunks;
generating storage metadata associated with the plurality of data chunks and the at least one parity chunk;
storing, across a plurality of persistent storage devices, the plurality of deduplicated data chunks and the at least one parity chunk, wherein the plurality of persistent storage devices is operatively connected to the storage controller and a second storage controller;
storing the storage metadata in the storage controller; and
sending a copy of the storage metadata to the second storage controller.

2. The method of claim 1, further comprising:
identifying, by the storage controller, a state of the second storage controller;
making a first determination that the second controller is not in a functioning state;
initiating, in response to the first determination, a health-check on at least one chunk in a first persistent storage device assigned to the second storage controller, wherein the first persistent storage device is one of the plurality of persistent storage devices.

3. The method of claim 2, wherein initiating the health-check on the at least one chunk comprises:
obtaining a first chunk from the first persistent storage device;
generating a first chunk identifier using the first chunk;

making a second determination that the first chunk identifier does not match a second chunk identifier stored in the storage metadata; and in response to the second determination:
obtaining a plurality of chunks associated with the first chunk;
regenerating the first chunk using the plurality of chunks to generate a new first chunk;
storing the new first chunk in a second persistent storage device of the plurality of persistent storage devices;
updating the storage metadata based on storage of the new first chunk.

4. The method of claim 3, wherein the second persistent storage device is assigned to the first storage controller.

5. The method of claim 3, wherein updating the storage metadata comprises:
updating the second chunk identifier with a third chunk identifier of the new first chunk; and
updating a storage location of the first chunk with a storage location of the new first chunk.

6. The method of claim 1, wherein the storage metadata is stored in memory of the first storage controller.

7. The method of claim 1, wherein a first subset of the plurality of persistent storage devices is assigned to the first storage controller for health-checking and wherein a second subset of the plurality of persistent storage devices is assigned to the second storage controller for health-checking.

8. The method of claim 7, wherein a first portion of the deduplicated data chunks are stored in the first subset and a second portion of the deduplicated data chunks are stored in the second subset.

9. A non-transitory computer readable medium comprising computer readable program code, which when executed by a computer processor enables the computer processor to perform a method for managing data, the method comprising:
obtaining, by a storage controller, data from a host;
applying an erasure coding procedure to the data to obtain a plurality of data chunks and at least one parity chunk;
deduplicating the plurality of data chunks to obtain a plurality of deduplicated data chunks;
generating storage metadata associated with the plurality of data chunks and the at least one parity chunk;
storing, across a plurality of persistent storage devices, the plurality of deduplicated data chunks and the at least one parity chunk, wherein the plurality of persistent storage devices is operatively connected to the storage controller and a second storage controller;
storing the storage metadata in the storage controller; and
sending a copy of the storage metadata to the second storage controller.

10. The non-transitory computer readable medium of claim 9, the method further comprising:
identifying, by the storage controller, a state of the second storage controller;
making a first determination that the second controller is not in a functioning state;
initiating, in response to the first determination, a health-check on at least one chunk in a first persistent storage device assigned to the second storage controller, wherein the first persistent storage device is one of the plurality of persistent storage devices.

11. The non-transitory computer readable medium of claim 10, wherein initiating the health-check on the at least one chunk comprises:

obtaining a first chunk from the first persistent storage device;
generating a first chunk identifier using the first chunk;
making a second determination that the first chunk identifier does not match a second chunk identifier stored in the storage metadata; and
in response to the second determination:
obtaining a plurality of chunks associated with the first chunk;
regenerating the first chunk using the plurality of chunks to generate a new first chunk;
storing the new first chunk in a second persistent storage device of the plurality of persistent storage devices;
updating the storage metadata based on storage of the new first chunk.

12. The non-transitory computer readable medium of claim 11, wherein the second persistent storage device is assigned to the first storage controller.

13. The non-transitory computer readable medium of claim 11, wherein updating the storage metadata comprises:
updating the second chunk identifier with a third chunk identifier of the new first chunk; and
updating a storage location of the first chunk with a storage location of the new first chunk.

14. The non-transitory computer readable medium of claim 9, wherein the storage metadata is stored in memory of the first storage controller.

15. The non-transitory computer readable medium of claim 9, wherein a first subset of the plurality of persistent storage devices is assigned to the first storage controller for health-checking and wherein a second subset of the plurality of persistent storage devices is assigned to the second storage controller for health-checking.

16. The non-transitory computer readable medium of claim 15, wherein a first portion of the deduplicated data chunks are stored in the first subset and a second portion of the deduplicated data chunks are stored in the second subset.

17. A data cluster, comprising:
a first storage controller;
a second storage controller; and
a plurality of persistent storage devices,
wherein the first storage controller is programmed to:
obtain data from a host;
apply an erasure coding procedure to the data to obtain a plurality of data chunks and at least one parity chunk;
deduplicate the plurality of data chunks to obtain a plurality of deduplicated data chunks;
generate storage metadata associated with the plurality of data chunks and the at least one parity chunk;
store, across the plurality of persistent storage devices, the plurality of deduplicated data chunks and the at least one parity chunk;
store the storage metadata in the first storage controller; and
send a copy of the storage metadata to the second storage controller.

18. The data cluster of claim 17, wherein the storage controller is further programmed to:
identify a state of the second storage controller;
make a first determination that the second controller is not in a functioning state;
initiate, in response to the first determination, a health-check on at least one chunk in a first persistent storage device assigned to the second storage controller, wherein the first persistent storage device is one of the plurality of persistent storage devices.

19. The data cluster of claim 18, wherein initiate the health-check on the at least one chunk comprises:
obtaining a first chunk from the first persistent storage device;
generating a first chunk identifier using the first chunk;
making a second determination that the first chunk identifier does not match a second chunk identifier stored in the storage metadata; and
in response to the second determination:
obtaining a plurality of chunks associated with the first chunk;
regenerating the first chunk using the plurality of chunks to generate a new first chunk;
storing the new first chunk in a second persistent storage device of the plurality of persistent storage devices;
updating the storage metadata based on storage of the new first chunk.

20. The data cluster of claim 17,
wherein a first subset of the plurality of persistent storage devices is assigned to the first storage controller for health-checking and wherein a second subset of the plurality of persistent storage devices is assigned to the second storage controller for health-checking, and
wherein a first portion of the deduplicated data chunks are stored in the first subset and a second portion of the deduplicated data chunks are stored in the second subset.

* * * * *